H. SCHLARBAUM.
Rubber-Coated Cord and Cordage.

No. 166,306. Patented Aug. 3, 1875.

Witnesses:
A. Moraga.
O. A. Weidner

Inventor:
Hermann Schlarbaum
by his attorney
O. v. Briesen

UNITED STATES PATENT OFFICE.

HERMANN SCHLARBAUM, OF CLIFTON, NEW YORK, ASSIGNOR TO GOOD-YEAR'S INDIA-RUBBER GLOVE MANUFACTURING COMPANY.

IMPROVEMENT IN RUBBER-COATED CORD AND CORDAGE.

Specification forming part of Letters Patent No. 166,306, dated August 3, 1875; application filed May 1, 1875.

*To all whom it may concern:*

Figure 1:
Figure 2:

Be it known that I, HERMANN SCHLARBAUM, of Clifton, in the county of Richmond and State of New York, have invented a new and Improved Rubber-Covered Rope and Cordage, of which the following is a specification:

Figure 1 is a side view, partly in section, of a piece of rope covered with rubber according to my invention. Fig. 2 is a transverse section of the same.

Similar letters of reference indicate corresponding parts in all the figures.

This invention relates to a new method of covering rope or cordage which is composed of strands of fibrous materials laid side by side or twisted together with rubber; and the invention consists in covering the rope or cordage with a sheet of rubber, which is laid around the rope either spirally or lengthwise, so that the edges of the rubber sheet will overlap, the continuous rubber tube thus formed being then vulcanized to leave the inner part proportionately raw, as hereinafter more fully described.

The letter A in the drawing represents a piece of rope or cord composed of hempen or other fibrous strands that are twisted together in the usual way, or laid side by side, as may be required. B is a rubber covering, being a sheet of thin india-rubber. This covering is laid around the rope or cord, by preference, in a spiral direction, so that the edges of the covering will overlap, and the covering will embrace the entire length of the rope. The covering is thus made continuous; but, instead of laying it spirally around the rope, the rubber covering may be laid so as to have a longitudinal seam where the edges overlap. After this covering has been laid around the rope, the entire rope, with the covering on, is subjected to the process known as the vulcanizing or curing process in the treatment of india-rubber, and is exposed to such vulcanizing action for a length of time sufficient to cure the outer portion of the rubber covering, leaving the inner portion, by preference, comparatively raw. It is preferable to not cure the entire thickness of the covering, for the reason that the raw inner surface will serve as a cement for connecting the two substances under strain, and preventing them from becoming separated.

I am aware that fibrous ropes have heretofore been saturated and coated with caoutchouc or rubber; but the coating was, to my knowledge, never yet applied in form of a sheet, whose edges overlap to form a continuous tube, and which is then vulcanized, so that the tube will remain cemented to the rope, by leaving the interior comparatively raw.

I claim as my invention—

1. As a new article of manufacture, fibrous cord or rope covered with a continuous sheet of rubber, which forms a lap-joint, substantially as specified.

2. In the art of covering fibrous cord or rope with rubber, the process which consists in applying a raw sheet of rubber around said cord or rope, and subsequently vulcanizing the rubber to an extent which will leave the inner part of the rubber comparatively raw, so it will constitute a cement, substantially as specified.

The above description of my invention signed by me this 28th day of April, 1875.

H. SCHLARBAUM.

Witnesses:
E. C. WEBB,
A. V. BRIESEN.